US008819142B1

(12) United States Patent
Golub (10) Patent No.: US 8,819,142 B1
(45) Date of Patent: Aug. 26, 2014

(54) METHOD FOR RECLASSIFYING A SPAM-FILTERED EMAIL MESSAGE (75) Inventor: Seth Golub, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 2283 days.

(21) Appl. No.: 10/882,845

(22) Filed: Jun. 30, 2004

(51) Int. Cl.
G06F 15/16 (2006.01)

(52) U.S. Cl.
USPC .......................................................... 709/206

(58) Field of Classification Search
USPC ................................................ 709/207, 206
See application file for complete search history.

(56) References Cited

U.S. PATENT DOCUMENTS

| 5,751,993 | A | * | 5/1998 | Ofek et al. ..................... 711/136 |
| 6,023,723 | A | * | 2/2000 | McCormick et al. ......... 709/206 |
| 6,487,641 | B1 | * | 11/2002 | Cusson et al. ................. 711/144 |
| 7,162,401 | B1 | * | 1/2007 | Abeles ............................. 703/13 |
| 2003/0208544 | A1 | * | 11/2003 | Wilson ........................... 709/206 |
| 2003/0233418 | A1 | * | 12/2003 | Goldman ....................... 709/206 |
| 2004/0093384 | A1 | * | 5/2004 | Shipp ............................. 709/206 |
| 2004/0107258 | A1 | * | 6/2004 | Kim ............................... 709/206 |
| 2004/0177110 | A1 | * | 9/2004 | Rounthwaite et al. ........ 709/202 |
| 2004/0199590 | A1 | * | 10/2004 | Keohane et al. .............. 709/206 |
| 2004/0230572 | A1 | * | 11/2004 | Omoigui ........................... 707/3 |
| 2006/0265498 | A1 | * | 11/2006 | Turgeman et al. ............ 709/225 |

* cited by examiner

Primary Examiner — John MacIlwinen
(74) Attorney, Agent, or Firm — Morgan, Lewis & Bockius LLP (57) ABSTRACT A spam filter for changing or validating original filter classifications of email messages filtered in an email system includes a means for accessing email message data and original filter result data; a means for accessing new evidence for use in classification; and a means for recalculating a classification using the new evidence.

25 Claims, 6 Drawing Sheets

METHOD FOR RECLASSIFYING A SPAM-FILTERED EMAIL MESSAGE

FIELD OF THE INVENTION

The present invention is in the field of electronic messaging including email messaging and pertains particularly to methods and apparatus reclassifying or validating an original classification of an email message processed by a spam-filtering system.

CROSS-REFERENCE TO RELATED DOCUMENTS

The present invention is related in part to U.S. application Ser. No. 10/882,939, filed Jun. 30, 2004, entitled "Methods and Apparatus for Detecting Spam Messages in an Email System" and U.S. application Ser. No. 10/882,850, filed Jun. 30, 2004, entitled "Detection Engine for Detecting Presence of Bulk Electronic Email". The entire disclosures of the above US patent applications are incorporated herein by reference.

BACKGROUND OF THE INVENTION

In the field of network communications, more particularly Internet network communications, spam messaging in the form of unsolicited email has become more and more prevalent, targeting both commercial and private consumers. Spamming, generally defined, is the process of sending mass unsolicited messages to network users in the form of e-mail messaging or other text messaging.

There are a variety of known technologies that have rather recently been developed to fight spam messaging, and these are collectively known in the art as spam filtering. Typical prior-art spam filtering techniques may rely on the presence of some common and/or unusual traits in spam messages and may attempt to classify messages as spam messages according to detection and sometimes analysis of those traits.

Arguably the most prevalent existing spam filtering systems may be software applications that use word detection of pre-compiled key words or in some cases phrases that might be known to appear in spam messages. These structured text-based filters may look for keywords or phrases that appear in email headers, subject lines, and message bodies. There are Bayesian filters, statistical filters, white and blacklist filters, and heuristic filters that may perform a number of tests on messages and compare weighted values against a pre-defined weight threshold. Many of these filters may be trained by fine-tuning. For example, manually selecting a message that has escaped filtering and marking that message as spam may cause addition of new parameters to the filter criteria so that in the future similar messages may be detected and identified as spam.

Spam filtering may be performed locally (typically at a users station) by software installed thereon or in many cases as a service at the server-side of a user's connection by server-based software, as may be the case with most Web-based e-mail servers. Often there may be software components at both sides of a communications link. There may also be private and public databases (blacklists) containing identification information of known spam senders. Blacklisting might occur when spam is discovered and may involve listing parameters about the spammer like IP address, company name and address, or URL addresses that may be known to be spam related.

As time goes by spammers become aware of efforts to defeat their purposes, and the spam senders develop now techniques to avoid the tools and processes developed to thwart them. For example, keywords and phrases that might be subject to filtering by text-based parsing and comparison to known words or phrases may be masked using hidden characters that are machine readable but do not appear to a human recipient. Keywords may often be intentionally misspelled as well as rearranged with respect to phrasing. Spammers may also insert characters into message headers and message bodies or into URL strings in an attempt to hide from conventional filtering systems. Filtering for phrases and phrase variations may also be time consuming and process intensive and therefore may not be completely practical for most applications.

Spammers may also use well-known spoofing methods to hijack trusted machines, universal resource locators or domain names of trusted sources, and sometimes set up fraudulent (counterfeit) Web sites for interaction, the Web sites perhaps emulating those sources. Real contact information may often be masked to foil automated location attempts, but may be left intact enough for facilitating a receipt of user monies, or user participation with respect to the goal of the spammer. One thing that may be common to essentially all spam messages is some parameter that directs a recipient's participation, whether it's a postal address for sending money, a URL for directing recipients to a Web site, a telephone number to call, or some combination of the above.

Some state-of-the-art spam filters may remove an impressive percentage of Spam mail before the mail is deposited into a user inbox, up to 90% or more in some cases. However spammers, knowing that a good percentage of their mails might be intercepted before reaching a user, may simply increase the numbers of messages originally sent to insure that the portion that makes it through remain an adequate amount for their purposes. In a given spam campaign, the actual messages themselves may often be altered slightly from message to message so that there appear to be differences among messages in a same batch. In this way spammers may increase their percentage figures of mails that ultimately escape the filtering process.

In some systems known to the inventor and identified in the cross-reference section of this specification, spam filtering may be initiated on email messages before they are stored in a message store for client access. These systems may leverage external information and internal information or evidence for use in weighting to provide trust metrics that are associated with email data such as return path information parsed from email messages to help with a more accurate spam classification. Return path information may also be utilized in one of the mentioned systems to associate multiple email messages that might be related to a bulk email campaign that may be classified as a spam campaign.

One drawback to most email spam-filtering systems may be the likelihood for incorrect classification of some filtered email messages. For example, a percentage of email messages that are spam might be missed by a given filtering system and therefore classified as trusted email by default. Likewise, some trusted email might inadvertently be classified as spam based on incorrect or weak evidence.

Many filtering systems may simply determine a positive or negative classification for spam based on the amount of internal information that can be leveraged in a given time period for classification processing using any of the various filtering techniques. With respect to time, spam-filtering systems may process emails after they are received and stored for access by clients of a store-and-forward email server system for example. In these cases the filtering process may begin only after a client logs in to access email, leaving a small time window for correct classification.

In the case of incorrect classification by a spam filter, a client may have to browse a spam email folder, for example, to determine if any email classified as spam is actually trusted email. Likewise, a user may feel compelled to browse email in an inbox reserved for trusted email for any email that may actually be spam email. Such activity may, depending on volume of messages, be time consuming and wasteful.

Therefore what is clearly needed is a method for reclassifying or validating the original classification of spam-filtered email messages using newly found evidence.

SUMMARY OF THE INVENTION

In an embodiment of the invention a spam filter for changing or validating original filter classifications of email messages filtered in an email system is provided including a means for accessing email message data and original filter result data, a means for accessing new evidence for use in classification, and a means for recalculating a classification using the new evidence. In one embodiment the means for accessing email message data and original filter result data may be a data search function, the search function triggered by a system event. The system event may be the arrival of new evidence. Also the spam filter may be a keyword filter and the new evidence includes one or more new spam-related keywords.

In some embodiments the spam filter may be a return-path feature filter and the new evidence may include one or more new return path features and any associated trust metrics. In some embodiments the spam filter may use keywords and return-path features including trust metrics to filter email messages. The spam filter may further include a data access interface to a data cache.

In another aspect of the invention a system for tracking spam-filtered email message data for possible reclassification or validation of original classification is provided including a spam filter having a means for receiving external evidence, a data cache for caching the message data and original classification data, and a mechanism responsive to a triggering system event for launching a re-evaluation of message data being tracked. The means for acquiring external data may be a search function.

In some embodiments external evidence may include one or a combination of new keywords, new return-path features, and any associated trust metrics. Further the data cache and spam filter may be implemented within an email server. The data cache may have a portion for caching email feature data and a portion for tracking email messages subject to reevaluation. The mechanism for launching a reevaluation of message data may be a set of instructions for activating a search function.

Also in some embodiments the reevaluation may include reweighing classification variables with new evidence included as one or more added variables in calculation. A time window may exist defining a time to live for data subject to reevaluation.

In yet another aspect of the invention a method for tracking and reevaluation of spam classifications is provided including (a) receiving email message data; (b) processing the received data for indication of spam; (c) rendering a portion of the data into a searchable portion of memory; (d) rendering a second portion of the data into an accessible portion of memory; and (e) associating the data rendered in the searchable portion of the memory to data rendered in the accessible portion of the memory.

In some embodiments in act (a) the data may include email feature data used for initial spam filtering. Also in some embodiments in act (b) the processed data may include one or a combination of keywords, return-path features, and any associated trust metrics. Also in act (b) the initial classifications may be spam or trusted. Still in act (b) processing may be performed directly from a message store of an email server. In act (c) the data may include data features taken from email data for use in spam filtering. Also the data features may include one or more or a combination of keyword data, envelope data, and return-path data. Still in act (c) the data may be rendered as single and unique data entries. Further in act (c) the features may be those that were not instrumental in initial spam classification.

In some embodiments, in act (d) the accessible portion may be organized as a plurality of email message clusters each cluster identified to a recipient and containing message data sent to that recipient. Also in act (d) the data may include client identification data, message identification data, initial classification indication, classification weighting variables, and unmatched feature data. In act (e) association may include a list of client identifiers and message identifiers.

In still another aspect of the invention, in a system for tracking spam-filtered email messages for possible reclassifications or validations of original classifications, a method is provided for accessing message data for spam classification reevaluation based on new evidence including (a) receiving new evidence related to email data used for spam classification of email messages; (b) searching a data source of email data using the new evidence as search criteria; (c) obtaining a data match of new evidence to email data stored in the data source; (d) accessing a list of one or more message identifiers and one or more associated recipient identifiers from the data source, the list associated with the data match; (e) locating one or more allocated memory portions identified by recipient and message identifier; and (f) retrieving data from those memory portions for use in reevaluating the original classification or classifications.

In some embodiments the tracking system may include a spam filter having a means for receiving external evidence; a data cache for caching the message data and original classification data; and a mechanism responsive to a triggering system event for launching a reevaluation of message data being tracked. In some embodiments in act (a) the new evidence may be one or more of or a combination of new keywords, new envelope parameters, or new return-path features and any associated trust metrics. In act (b) the data source may be a data cache. Also in act (b) the email data may include one or more of or a combination of keywords, envelope parameters, return-path features and any associated trust metrics.

In some embodiments in act (b) the search may be performed by a spam filter having received the new evidence. Also in act (b) the data may be represented in the data source as single and unique data entries. In act (c) the match may include one or more features of the new evidence to one or more stored features. In act (d) the list may be provided by a tracking module. In some embodiments the data cache may contain a portion for storing email feature data, and one for storing email feature data, spam classification variables used in initial spam classification, and classification result data.

In some cases in act (e) location is enabled by location information provided in the list accessed in act (d). Also in act (e) the memory portions are allocated per client and contain message data received by the client and organized as a cluster of messages owned by the client. In act (f) the data retrieved includes the original classification indication and the old variables used in the original classification. Further in act (f)

reevaluation of data produces either a validation of the original classification of a message or a change of classification of a message.

In yet another embodiment a machine-readable medium having stored thereon a set of instructions that cause a machine to perform a method is provided, including (a) receiving new evidence related to email data used for spam classification of email messages; (b) searching a data source of email data using the new evidence as search criteria; (c) obtaining a data match of new evidence to email data stored in the data source; (d) accessing a list of one or more message identifiers and one or more associated recipient identifiers from the data source, the list associated with the data match; (e) locating one or more allocated memory portions identified by recipient and message identifier; and (f) retrieving data from those memory portions for use in reevaluating the original classification or classifications.

In yet another aspect of the invention a machine-readable medium having stored thereon a set of instructions that cause a machine to perform a method is provided including (a) receiving email message data; (b) processing the received data for indication of spam; (c) rendering some of the data into a searchable portion of cache memory; (d) rendering some of the data into an accessible portion of the data cache; and (e) associating the data rendered in the searchable portion of the cache to data rendered in the accessible portion of the cache memory.

DESCRIPTION OF THE PREFERRED EMBODIMENTS

Figure 1:
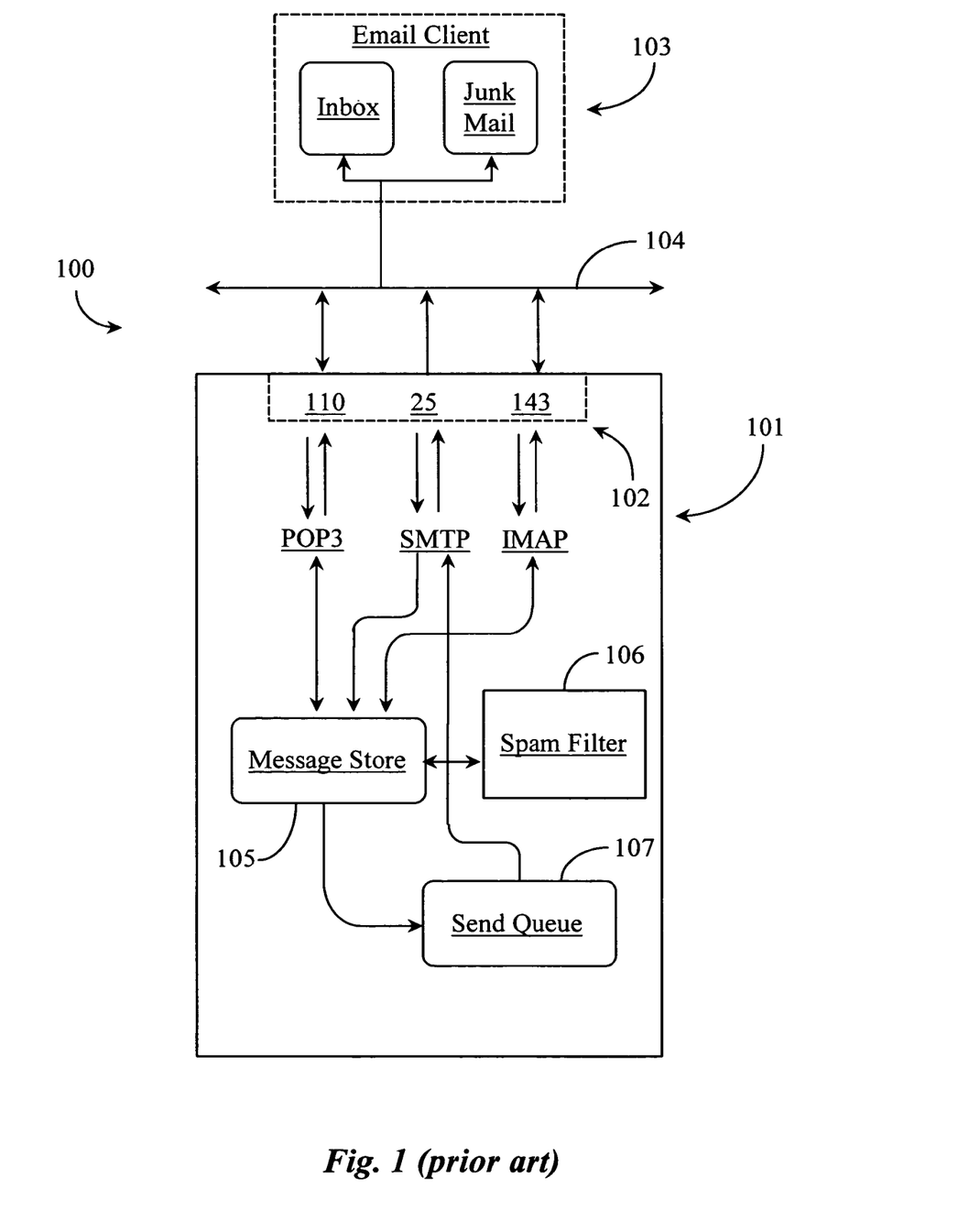
FIG. 1 is a diagram of a spam-filtering system according to an architecture known to the diagram overview of a spam-filtering system according to one embodiment of the present invention.

FIG. 1 is a diagram of a spam-filtering system 100 according to an architecture known to the inventor. System 100 may include an email server 101, a connection network 104, and an exemplary client station 103. Email server 101 may be enhanced to filter email using a spam filter 106. Server 101 may include communication ports 102 including a post office protocol (POP) 3 port (110), which may be adapted to enable clients such as client 103 to access server 101 over network 104 for the purpose of viewing and downloading email. Similarly, an Internet Mail access protocol port (IMAP) port (143) may be provided for client access of Internet based email. IMAP enables access to email without requiring a desktop client application. Users may thus access email from any connected network-capable device. A simple message transfer protocol (SMTP) port (25) may be provided to server 101 and may be adapted to enable transfer of incoming messages into server 101 and transfer of outgoing messages from server 101 as may be typical of most email servers.

A typical email server such as server 101 may include a machine-readable storage medium (also called a computer readable storage medium) that includes a message store 105 for listing and accounting for incoming messages received at server 101 and held for client access. A send queue 107 may be provided for holding outgoing emails before transferring them out of server 101. A spam filter 106 (stored in the machine-readable storage medium of the server 101) may be provided, as is the case in this example, for filtering email messages for clients typically when clients access email messages from message store 105 through ports 110 or 143.

Exemplary client station 103 may gain access to server 101 to view and download email messages over connection network 104, which may be the Internet network. Using port 110 or 143, client 103 may download messages held for access in message store 105. Such accessed email messages may be downloaded, typically to a client inbox illustrated within client station 103 and/or a junk mail folder illustrated within client station 103 according to filter classification results provided by spam filter 106. In typical implementation, filter 106 may be called when client 103 makes a connection to server 101 and provides the required authorization in order to view and download email.

Spam filter 106 may be adapted to filter for spam-related keywords, characters, and phrases. Filter 106 may also be adapted to check white lists and/or black lists provided by client 103. In one implementation spam filter 106 may only classify email messages as spam email or as trusted email messages. Spam email messages may be filed in a junk email folder of client station 103 while trusted email messages may be filed in an inbox of client station 103 as illustrated in this example.

One problem with classification in this example is that for a percentage of messages filtered, spam filter 106 may not have enough available information to definitively classify email messages as spam or as trusted. As a result, some trusted email may be incorrectly classified as spam email while some spam emails may be inadvertently classified as trusted email messages. A client such as client 103 may then be required to browse or review both an inbox and a junk mail folder in order to be sure that all classified emails are filed correctly. If spam filter 106 has a convention for classifying email messages as "condition unknown" meaning it is not certain if an email message is spam or not, then there may be a third folder maintained in client 103 for holding such messages. In this case, the user may have to review this folder and make visual determination of spam or not with respect to any messages filed therein for review.

Figure 2:
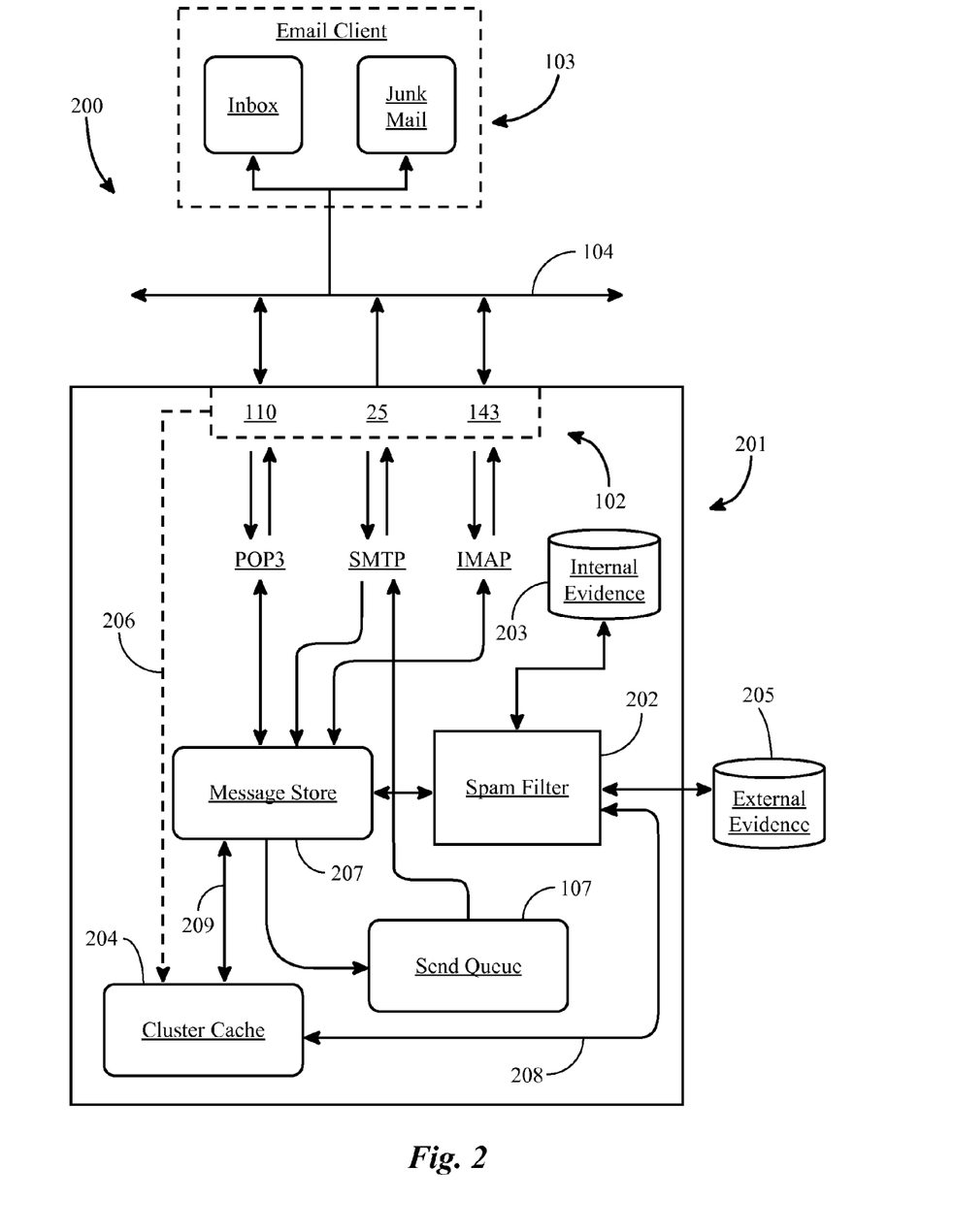
FIG. 2 is a diagram of a spam-filtering system according to some embodiments of the present invention.

FIG. 2 is a diagram of a spam-filtering system 200 according to one embodiment of the present invention. Some elements of this exemplary embodiment are unmodified by the present invention and unchanged from their description with reference to FIG. 1 above. Such elements retain their original element numbers and are not reintroduced.

System 200 may include client station 103, connection network 104, and an email server 201 enhanced for practice of the present invention. Email server 201 is similar to email server 101 with reference to ports 102, and send queue 107. In this exemplary embodiment, server 201 is enhanced for spam filtering using a spam filter 202. Server 201 includes one or more processors and computer readable storage (e.g., memory devices or other computer readable storage media) storing programs for execution by the one or more processors. Filter 202 may be adapted to filter email messages on behalf of clients such as one operating client station 103 using existing internal evidence represented by a data store 203 and/or an external evidence source represented by a data store 205.

Internal evidence store 203 may be an optical or other digital storage medium that may be adapted to hold and serve data such as a list of key words, phrases, and/or characters commonly associated with spam email messages. White list data and black list data may also be stored for access in internal evidence store 203. Internal evidence 203 may also include raw data and value-oriented data about return path parameters that may be extracted from email messages by spam filter 202. Return path parameters are defined in this specification as any parameters that are related to email, telephone, postal address, or URL features provided in an email message for the purpose of enabling a recipient to cooperate with a goal of the host message. Such parameters usually provide a return path to some entity associated with the true sender of the message or the sending entity itself in order to enable message recipients to send money or to otherwise participate in some way with the goal of the message.

Spam filter 202, as described above, may also be adapted to access external evidence when filtering email messages. External evidence may be defined as one or more external data sources, private or public, that may be searched or queried for any evidence that may be used by filter 202 to help classify an email message as spam email or as trusted email. External evidence 205 may include a searchable database that may contain information related to return-path data, or other data not found in internal evidence 203 at the time of processing any particular email message. Such data may include return-path features or sub-features including any value-oriented data or "trust metrics" that may be compiled for and associated with the data.

It may be assumed in this example that spam filter 202 may filter email for clients regardless of client access parameters, meaning that filtering may begin, in one embodiment, for client messages as soon as those messages enter server 201, typically through SMTP port 143. Spam filter 202 may process messages in one embodiment directly from message store 207 for initial classification of messages.

In this exemplary architecture, a cluster cache 204 may be provided within email server 101 and may be adapted to hold email message data that may be copied thereto or otherwise written thereto from message store 207, the data perhaps including certain data not sourced from message store 207 but sourced from spam filter 202. Spain filter 202 may be provided access to cluster cache 204 through a data link 208. Message store 207 may be provided access to cluster cache 204 through a synchronization link 209. In one embodiment, cluster cache 204 may be provided access to port structure 102 through an access link 206 and appropriate firmware may be provided to port structure 102 and adapted to enable mirroring of email data from the appropriate ports 102 (SMTP 25) directly into cache 204.

Cluster cache 204 may be any combination of random access memory (RAM), flash memory, and read only memory (ROM) as may be desired for supporting temporary storage of data and some permanent components that organize data, provide data service, and data tracking. In this exemplary embodiment, cache 204 may be accessed directly by spam filter 202 over data link 208 and by message store 207 over link 209.

In one embodiment of the present invention using system 200, incoming email messages may be stored in message store 207 for clients and may be accessed for filtering by spam filter 202 as soon as they are available. In this embodiment, all available email messages identified for clients in message store 207 may be subjected to email filtering regardless of any client/server connection states. Spam filter 202, for example, may access email data from store 207 and commence email filtering using internal evidence 203 and if required for definitive classification, external evidence 205.

Spam filter 202 may initially classify an email message as spam email or as trusted email using internal and or external evidence sources 203 and 205 respectively. Spam filter 202 may be further adapted in this embodiment to cause certain email data taken from the classified message and classification result data, including variables used in the classification, to be entered into cluster cache 204 and to be retained for a certain period of time. In this case, if some additional evidence becomes available that might have bearing on the classified email message, and the recipient of the message has not yet accessed server 201 to view or download the message, then the classified email message may be reclassified if necessary using the additional evidence obtained in conjunction with any variable data retained from the initial classification sequence in calculation.

In this way a number of email messages that have already been classified may be validated as to original classification or may be reclassified according to external data that may arrive at any time. The described method may be implemented in order to solidify any weak classifications or to correct any miss-classifications rendered initially by spam filter 202.

In one embodiment of the present invention, email message data incoming to server 201 is first diverted into cluster cache 204, which might be adapted to function as an email queue. In this case, spam filter 202 may be adapted to access email data directly from cache 204 to perform both initial classifications and, if necessary, reclassifications of email messages before the messages are caused to be available for access in message store 207. In this case, both internal evidence and external evidence may still be used to perform initial classifications, with any newly found evidence used when available to validate initial classifications or to cause reclassification of email messages still alive in the system.

In one exemplary embodiment, data entered into cluster cache 204 are organized into email message clusters (not illustrated) under appropriate client identification parameters for each cluster. A cluster may be loosely defined as a group of classified email messages listed for any one particular client of server 201. Therefore, there may be many separate email message clusters, each associated with a client who is the designated recipient of the clustered messages. An email message cluster may contain client identification data (owner of cluster), message identification data (for each message within cluster) and any included data parameters associated with identified email messages within a cluster, including any data provided by spam filter 202. More detail about email clusters is provided below.

Figure 3:
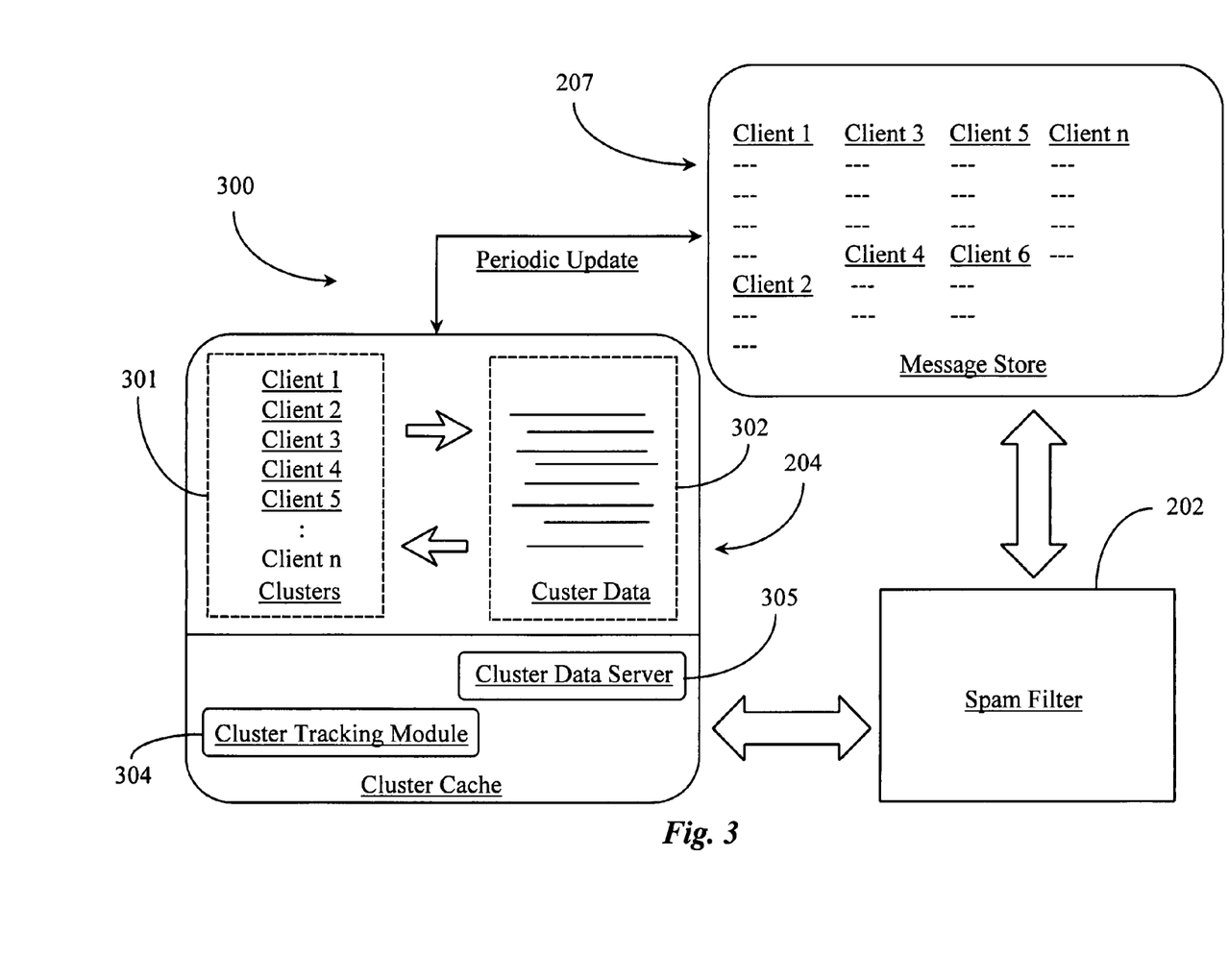
FIG. 3 is a block diagram illustrating relationship between a message store and a cluster cache of the system of FIG. 2 according to one embodiment of the present invention.

FIG. 3 is a block diagram illustrating a functional relationship between message store 207 and cluster cache 204 of the system of FIG. 2 according to one embodiment of the present invention. Message store 207 may be adapted typically to list client email messages sorted according to client email identification as is typical with email servers. In this example, a plurality of clients (Client 1-Client n) is illustrated having email messages waiting for view and download. The email messages are logically represented in this exemplary embodiment by dotted lines placed under each client. Spam filter 202 may, according to one embodiment, access message store 207 directly to initially filter and classify messages for clients 1-n as described above.

Cluster cache 204 may be adapted to store data written thereto by spam filter 202 as previously described above. In this example, cache 204 may be provided with a machine-searchable cluster data sector 302. Cluster data sector 302 may, in one embodiment, contain the email parameters that were parsed or were otherwise associated with email messages that have already been classified wherein the particular data parameters were not involved as variables or taken into consideration in the initial classification attempts of the email messages.

Cache 204 may, in the same embodiment, include a client cluster list 301 that is adapted to summarize all of the client email clusters currently represented in the email system. In an exemplary embodiment, each cluster identified in cluster list 301 may be mapped to appropriate cluster data represented as cluster data 302. Parameters maintained in cluster data 302 may not necessarily be repeated in cache memory holding cluster data 302. In other words a same parameter in cluster data 302 may be associated with more than one email message identified under more than one email client, and therefore does not need to be represented by more than one entry. In this case, cluster data 302 may contain mapping information that associates data represented therein to appropriate clusters of messages associated with clients represented in summary in list 301. List 301 and data 302 may be held in RAM and may be adapted for modification or overwrite through periodic updating triggered by various system events that might occur.

A cluster-tracking module 304 may be provided to cluster cache 204 and may be enabled to keep track of any associations between cluster data in sector 302 and client clusters represented in list 301, as well as keeping track of and purging, when necessary, data from valid clusters known to be in the system. Tracking module 304 may be software or firmware application or a set of machine-readable instructions adapted to take information and instruction from both message store 207 and spam filter 202. In one embodiment cluster data tuples may be tracked to more than one client cluster and may be specific to more than one email message currently included in a client cluster. Cluster tracker 304 enables a cluster and cluster messages to be tracked and identified from a data search operation of data sector 302.

In one example it may be assumed that a tuple in cluster data 302 is a return-path email address. It might be that the particular email address was parsed from email messages belonging to client email clusters 1, 3, and 5. The email address need only be represented as a single entry in cluster data 302. Cluster tracker 304 may provide a list of client identifiers and message identifiers upon a match obtained in cluster data sector 302, the list including host memory location information for enabling access of data related to the client and associated messages identified in the match.

A cluster data server 305 may be provided in one embodiment to grant access to spam filter 202 for searching data, retrieving data from, writing to, and deleting data from sector 302. In one embodiment, spam filter 202 may be adapted for searching cluster data 302 using some external evidence as search criteria through cluster data server 305 as an interface. In this case, the cluster tracking module may be employed if a data hit is registered to track the data hit to the appropriate clusters and messages currently still in cache.

Periodic updates may, in one embodiment, be made to cluster cache 204 from message store 207. For example, if a client accesses and downloads an email message from message store 207, an update may be sent to cluster cache 204 causing the cluster information for that client and particular message to be purged from cache. It may be that a client accesses message store 207 and downloads only part of a list of waiting email messages. In this case only the email message data associated with the downloaded messages might be purged from cluster cache 204, or more particularly from cluster list 301. In this case, if a cluster message is purged from list 301 and is associated with a particular cluster data tuple stored in cluster data 302, then that cluster data tuple might also be purged if it cannot be tracked to any other messages of the same or other clients represented in list 301. In any event, if spam filter 202 searches cluster data 302 based on an email parameter and receives a hit in cluster data 302, the purged cluster messages will no longer be tracked as related to the tuple because of the update activity from message store 207.

In one embodiment of the present invention email messages incoming to message store 207 may be initially filtered and classified as spam or trusted by spam filter 202. As filter 202 classifies messages, data taken from the messages including filter result data may be entered into cluster cache 204 and represented in cluster data 302 and in cluster list 301. As previously described above, spam filter 202 may have access to external data that is found only after there are messages in the system that have been classified.

Any time spam filter 202 might be notified of some new evidence found that might have bearing on one or more existing classifications of any of the email messages that are still alive in the system (not downloaded by clients), then filter 202 may use the evidence to attempt a hit in cluster data 302 using a request response format or some other machine-to-machine communication protocol through cluster data server 305. If a hit is obtained, then tracking module 304 may provide identification of all of the client clusters and particular messages that the current hit pertains to. Likewise, all associated cluster data may immediately be made available to the filter over the same session for each classified message identified that is related to the data hit. Filter 202 then may collect the data for each clustered message and may use the collected data in combination with the new evidence to recalculate the original classification of each identified message. Filter 202 may then validate the original classification of email messages, or may reclassify email messages according to the new evidence found.

In one embodiment, it may be assumed that an email waiting for a client has been classified as a trusted email message at least in part because no spam-related keywords were found in the message body. The system may cache the filter results, variables, and the parsed keywords taken originally from the message. The keywords may be entered into cluster data 302 in a fashion that is not redundant (no repeated entries). It may also be assumed in this same embodiment that before a client has accessed the particular message from message store 207 that some new keyword evidence not previously known to the system is obtained by the system. The new evidence, which might be a single keyword or a list of keywords, can be used as data search input to look for a data match in cluster data 302. If a match occurs for one or more than one of the keywords, the filter can track the message and pull the original parsed keywords, original filter weighting variables, and original filter results from the email. The new evidence can be included to recalculate the score for the email. The recalculation may cause the classification of the email message to change from trusted to spam, for example. Spam filter 202 may then directly access message store 207 and overwrite the former classification of trusted with the new classification of spam.

One with skill in the art will recognize that the system can be implemented with a variety of spam-filtering systems that employ a wide variety of filter criteria for classifying email messages. Keyword classification described in the above example represents just one possible filter type and criteria that lends to a clear explanation of one method of the present invention where the prevailing filter uses spam related keywords as filter criteria.

Figure 4:
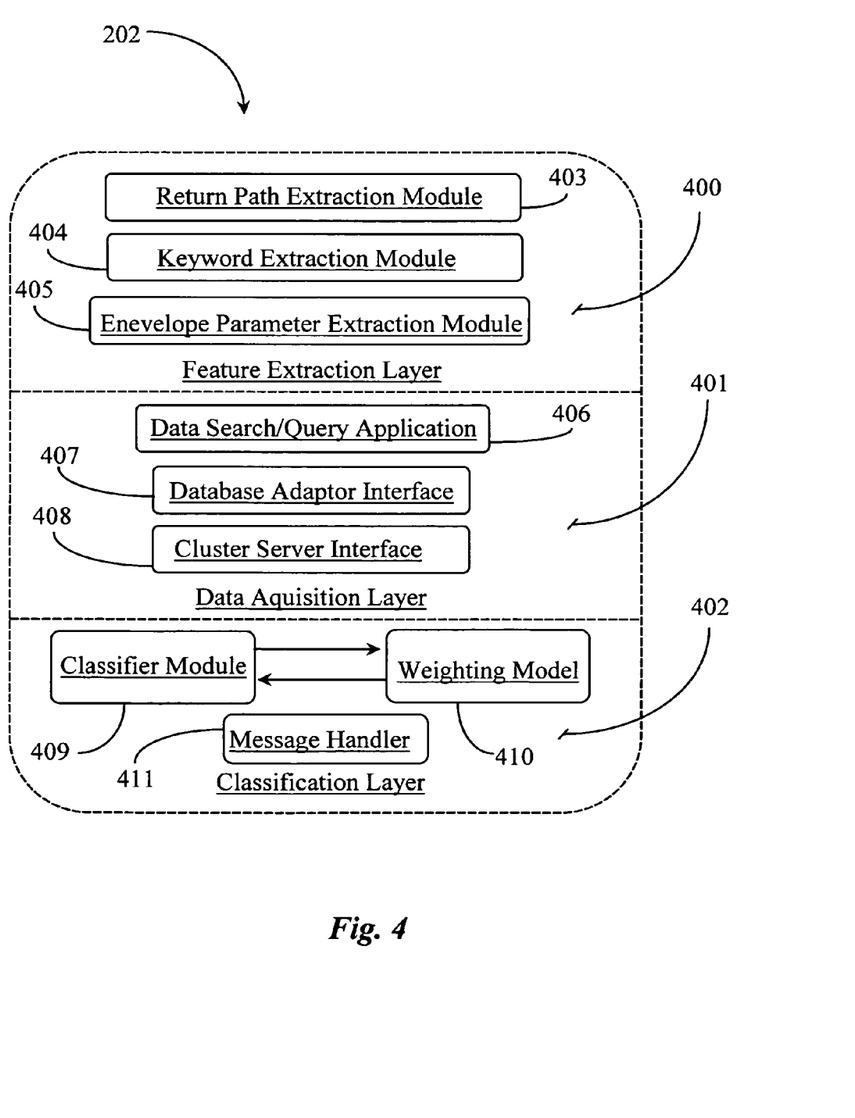
FIG. 4 is a block diagram illustrating functional software layers of the spam filter of FIG. 2 according to one embodiment of the present invention.

FIG. 4 is a block diagram illustrating functional layers of spam filter 202 of FIG. 2 according to one embodiment of the present invention. Spam filter 202 may be provided having a number of functional layers representing filtering function and capability. In this exemplary embodiment a functional layer 400 may be provided for enabling feature extraction from email messages subject to filtering. Layer 400 might be provided with one or a combination of a return-path extraction module 403, a keyword extraction module 404, and an envelope parameter extraction module 405.

Return path feature module 403 may extract return path features from the message body of an email message. A return path feature may include an email address, a URL, a telephone number, or a postal address. Module 403 may be adapted to identify and extract one or more of the mentioned feature or sub-features using structural models adapted to enable feature identification. In one embodiment sub-features may be extracted and then assembled into whole features. In one embodiment, filter 202 may use return path features exclusively in spam detection and may not require modules 404 or 405.

Keyword extraction module 404 may be provided within layer 400 for extracting keywords from an email message body that can be compared against a list of known spam-related keywords. Envelope extraction module 405 may be provided within layer 400 and adapted to extract parameters that are found in an email envelope portion. Such parameters may include sender address, carbon copy (CC) address, blind carbon copy (BCC) address, recipient email address, subject line, and so on. Envelope feature extraction module 405 may, in one embodiment, be used if white lists and/or black lists are consulted. For example, a sender email address may be found on a client white list.

Spam filter 202 may be assumed to have data access capabilities, which are represented in this exemplary embodiment by layer 401 dedicated to data acquisition. A search/query application 406 may be provided within layer 401 and adapted to enable filter 202 to call data sources and search or query those data sources for data. Query-based access can be automated using a form of structured query language (SQL) or an XML-based method used in some data systems employing X-Path data query techniques. Data search techniques may be adapted to automatically search pre-designated data sources using search input parameters representing information extracted from email messages by layer 400. Likewise, search activity might be initiated with reference to one data source using input representing data acquired through data searching of another data source. In this way newly found external evidence may be used as input to search cluster data for example.

In one embodiment, a database adaptor interface 407 is provided to enable data access to various data sources. More than one adaptor interface may be provided as might be required. A cluster server interface 408 may be provided within layer 401 and may be adapted to enable machine access to a cluster data server application such as cluster data server 305 described above with reference to FIG. 3. In one embodiment, a single database adaptor might be provided and enhanced or extended to include provisions for accessing a number of data sources including internal data, external data and cluster data. A new data source may, in this embodiment, be added to system access protocol by extending the single database adaptor to include the new source.

In one embodiment cluster data 302 may be data-searched from spam filter 202 using search application 406 wherein the application may be automatically launched and loaded by a set of machine instructions responding to a trigger event defining the arrival of some new evidence that might bear on an original classification of one or more messages alive in the system. In this case new evidence may arrive directly to spam filter 202, the presence thereof triggering an automatic data search of cluster data using input included in the new evidence data.

Classification layer 402 may be adapted primarily for weighting, classification and message handling or marking. A classifier module 409 is provided to determine the classifications and, if required, the reclassifications of email messages. Classification module 409 may rely, in one embodiment, on consultations with a weighting module 410. In one embodiment where spam filter 202 might use external evidence in addition to internal evidence in email message classification, weighting model 410 may provide a structure for comparing value-oriented data received from internal and/or external evidence sources.

In communication with classifier module 409, weighting model 410 may provide one or a series of scores or weights based on the value-oriented data received. In this case the value-oriented data may be related to actual email message features extracted from the email message being processed. For example, if the filtering criteria include analysis of return-path features, then a return path feature such as a zip code might have some value-oriented data associated with it, like a ratio that defines the commercial vs. residential make-up of the area defined by the zip code. In this case, weighting model 410 may return a single score based on the value data (commercial ratio) received. This score may be added to other returned scores related to other criteria considered in filtering.

Classification module 409 may, after consulting with model 410, provide a classification for the email message. Such a classification may be based solely on a single score derived from multiple weights. A message handler 411 may be provided within classification layer 410 and adapted to treat an email message according to classification such as, for example, marking or flagging an email message as spam or trusted after classification has been made. In one embodiment, all mail is initially classified before any data is cached. In this embodiment, data cached or organized into a cluster may include but is not be limited to client ID, message ID, data extracted from the message that still might be used in a message reclassification, variables and scores from the initial weighting or scoring algorithm, and the original classification designation of the message.

In the above example, data that might be used in reclassification may include email features that were taken from an email message during initial processing but that were not involved in the original classification lending to a possibility that some external evidence later found might bear weight on one or more of the left-over features. Leftover features of emails may be introduced into cluster data that is searchable in a fashion that no same feature is repeated in the record of features to avoid redundancy. If a search of cluster data draws a hit on one or more features present in the record, then that feature or those features may be tracked to the appropriate client and messages in a cluster of email messages standing for possible reclassification.

It will be apparent to one with skill in the art that some clients may access their email messages before any evidence arrives that might be used in reclassification. In this case, a message store such as store 207 described with reference to FIG. 3 may be adapted to synchronize with a cluster cache analogous to cache 204 described with reference to the same FIG. 3. Email message downloading may, in this case, cause one or more email message features to be purged from cluster data if there are no other clusters sharing those features with the cluster data record. In this way cluster data may be continually updated to contain only those features which are relevant to classified email messages that have yet to be accessed.

In one embodiment of the present invention email server logs may be analyzed for client access patterns. In this embodiment an average time-based pattern of email access can be determined for each client of the system. Pattern statistics related to frequency of access can be utilized to provide an estimate time frame for each cluster of email messages in the system cache to wait for possible reclassification or validation of original classification.

If no evidence arrives that might bear on any messages in a given cluster, then close to the estimated time of access by a client owning the messages, the cluster data might be purged along with any associated email message features stored in the cluster data record, if they do not belong to any other live clusters. The optimization of estimating access time may be used, in one embodiment, along with message store syncing.

In yet another embodiment of the invention, spam filter 202 includes a possible classification option of unknown, meaning that there was not enough initial evidence to cause a spam classification or a trusted classification. In a variation of the system of the invention, such messages that were not initially classified may be cached in clusters along with email messages that were initially classified. Any new evidence found that might bear weight on classification of these messages can be used to provide initial classification.

It will be apparent to one with skill in the art that new evidence may be found at any time during email processing and such evidence at the time of discovery and delivery may or may not prove useful for validation or reclassification of any current messages in a cluster. Therefore, according to yet another embodiment of the invention, certain features of messages waiting for reclassification may be used as input in a search for new evidence along with any normal evidence gathering methods. There are many variant configurations, which are possible without departing from the spirit and scope of the present invention.

Figure 5:
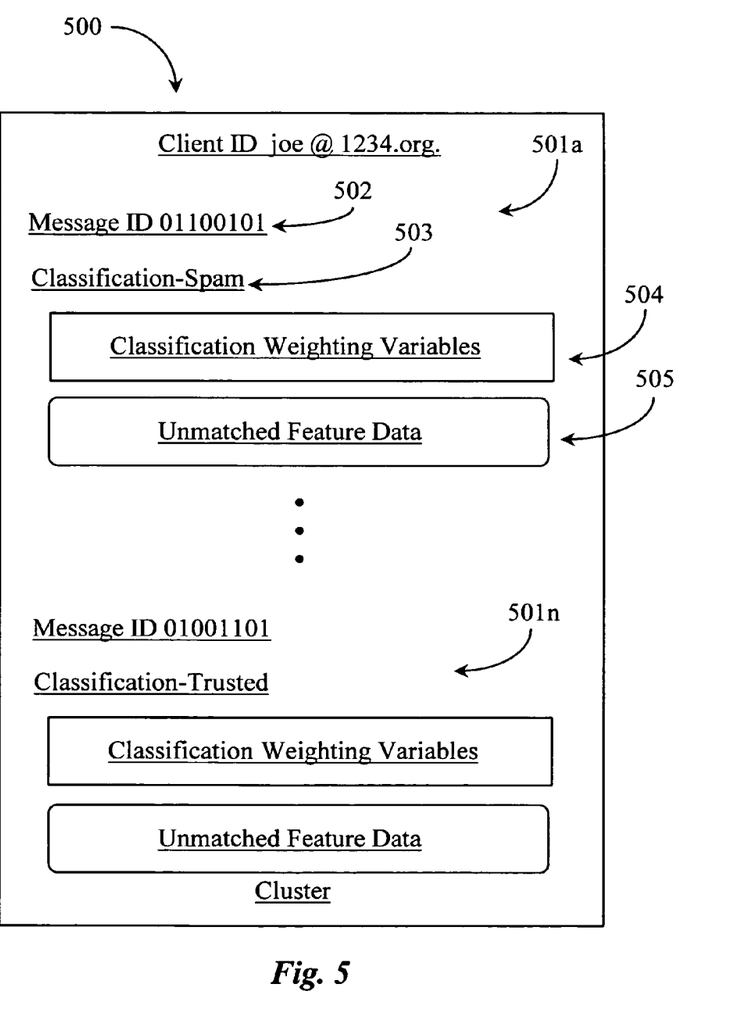
FIG. 5 is a logical plan view of a message cluster according to one embodiment of the present invention.

FIG. 5 is a logical plan view of a cluster 500 according to one embodiment of the present invention. Cluster 500 is a representation of data that may be gathered and organized as cluster data in a cluster cache such as cache 204 described with reference to FIG. 3 further above.

Cluster 500, in this example, may be organized by client. That is to say that each client of the system can have a cluster of messages represented in cache. In this case, the client owner of cluster 500 may be identified as joe@1234.org. A first message identified for this client may have parameters 501a associated thereto, which may include identification parameters, classification parameters, and actual data or data references. For example, cluster 500 identifies a first message with a message ID 502 of 01100101. ID 502 may be a binary number or any other unique identifier, which may be serially applied or randomly generated.

An initial classification parameter 503 might be spam for message 01100101 as is illustrated in this exemplary view. Classification weighting variables 504 may be provided from the initial classification attempt. Spam filter (202) may be adapted as previously described above to retain the variables used in weighting so that if evidence is found that might be used to change an initial classification, the entire weighting calculation does not have to be restarted. Variables 504 may be accessible to the spam filter only if a second classification attempt is ordered based on any new evidence found that may have bearing on the particular message.

Unmatched feature data 505 may be provided and associated with a message in cluster 500. Unmatched feature data may be defined as any data taken from an email message that did not play a part in the initial classification. For example, if an initial classification was performed on message 01100101 using a keyword spam filter, then those keywords found in the message that were instrumental in producing spam classification 503 may not be included in feature data 505 because they are already known to the system. Therefore, only keywords taken that have not been compared and matched with known data might be included because any new evidence found should, to avoid redundancy, not bear on features that were already known to the system during an initial classification.

Unmatched feature data 505 of message 502 of cluster 500 may be represented in a searchable cluster-data record such as in cluster data 302 described with reference to FIG. 3. This may be accomplished in a way to avoid redundancy by listing only a single feature in the searchable record but tracking that feature to all current message IDs and cluster Ids that share the feature.

In this example, it may be that the initial classification 503 for message 01100101 of spam is weak and based only on one or a very few keywords found to be spam-related. In reality it is not impossible to find some keywords linked to spam in trusted email. Perhaps some new evidence found includes several new keywords receiving a hit in the cluster data record. Perhaps the hit linked several of the keywords to message 502 of cluster 500. If the keywords were spam-related then message 01100101 might be further weighted as spam in a more definitive way or a validation for an initially weak classification. If the original classification of message 01100101 was trusted, because no keywords were found to be spam-related and the new evidence caused one or more of features 505 to be identified as spam-related, then message 01100101 might be reclassified as spam instead of trusted.

A cluster such as cluster 500 may identify many email messages, especially if the client performs infrequent access to the system email server for the purpose of retrieving messages. A last message is illustrated with parameters 501n, which includes all of the same parameters 501a listed for the first message. Any of possibly many messages in cluster 500 may be reprocessed at any time provided that the messages have not yet been purged from cache because of client access and download.

In one embodiment, if a client has just logged on to retrieve messages and one or more messages of cluster 500 is being reprocessed because of some new evidence found, then those messages may be temporarily delayed from access during the client session in progress with the email server. For example, if there are 10 messages being retrieved, and one or two messages are in the process of reclassification or validation of original classification, then those one or two messages may be delayed until the other eight messages have been downloaded. Depending on the connection capacity of the accessing client, it may be that there is time, figured on the estimated time required for downloading the other messages and any attachments, to complete processing of the one or two messages for which new evidence is being used to determine whether they will be reclassified or validated for original classification.

In one embodiment of the present invention, referring back to FIG. 3, cluster data may include feature entries that are mapped or tracked to the appropriate clusters and cluster messages by simply adding the associated tuples in lists that may be associated with a single entry. For example if an entry in cluster data 302 is a postal address feature, then that feature entry might have a number of attributes arranged in lists including but not limited to:

A list of all message IDs of messages from which the feature entry was extracted, and A list of all cluster IDs containing the messages sharing the feature entry Using cluster-tracking module 304, the cluster data server can look up and return all of the required data to spam filter 202 including weighting variables and original classification designations of all of the tracked messages that were associated with a data hit in cluster data 302. In one embodiment of the invention, two or more separate and subsequent data hits from new evidence may point to separate features of a same message currently being reprocessed as a result of a previous hit. In this case, the additional evidence may be immediately directed to the process that is currently reexamining the message and an interrupt may be generated by default to restart the process, enabling insertion of the additional evidence into the process. In another embodiment, interrupts may not be tolerated for a reexamination process currently running. In this case, subsequent hits pointing to a message under reexamination already might be ignored for that message.

Figure 6:
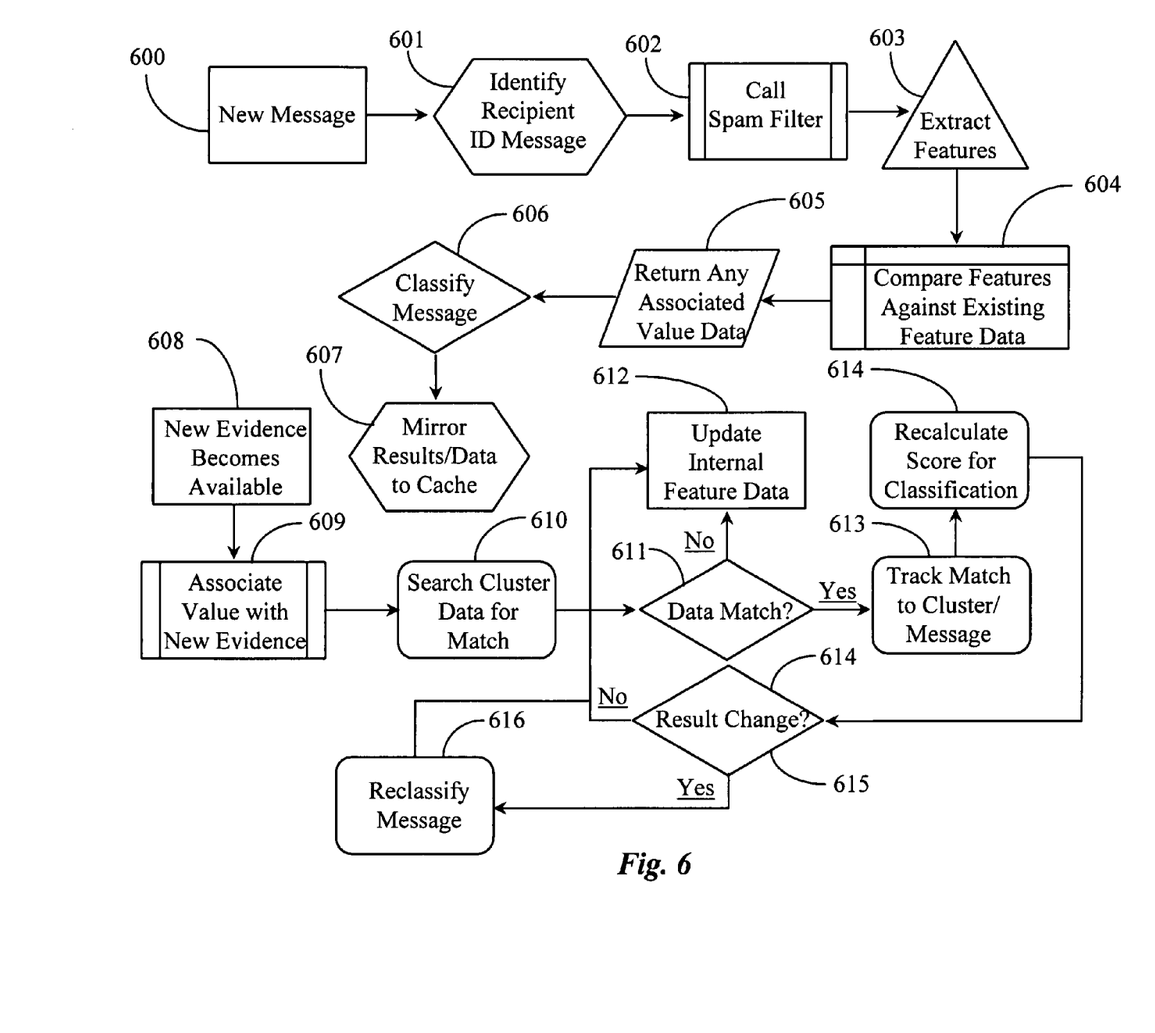
FIG. 6 is a process flow chart illustrating a process for message reclassification according to one embodiment of the present invention.

FIG. 6 is a process flow chart illustrating a process for message reclassification according to one embodiment of the present invention. At act 600 a new message may arrive at an email server hosting the system of the invention. At act 601 the message received in act 600 may be identified in terms of recipient and message identification number. Message identification may be simply a queue number or a randomly generated number. The message may also be time stamped at act 601.

At act 602 a spam filter analogous to spam filter 202 of FIG. 2 may be called to filter the message. The spam filter may use a variety of criteria for spam filtering including keywords, phrases, return path features, and envelope parameters. At act 603, features of the message may be extracted for use in determining whether the message might be spam or trusted.

At act 604, the features extracted in act 603 may be compared against existing feature data for match. At act 605 any value data associated with matching features may be returned to the spam filter for scoring or weighting. Such value data may be simply positive or negative indication associated with a particular feature, or it may be some percentage value or other quantative or numerical data value associated with a particular feature.

At act 606 the email message received in act 600 is initially classified. Classification may be spam, trusted or in some cases unknown. Acts 600 through 606 may represent initial or first classification of the message after it is received. At act 607 according to one embodiment of the present invention, data and filter results of the email message classified in act 606 may be mirrored to a cluster cache analogous to cluster cache 204 described with reference to FIG. 2. The cached data may be organized into a cluster of email message data belonging to the client (recipient of the message). Cached data may include the client ID or cluster ID, the ID of the message the data represents, any leftover feature data that was not used in classification, and any weighting variables and filter result data including indication of the initial classification of the message.

The process of initial classification and caching of message data represented in acts 600 through 607 may be performed serially by a single instance or in parallel using multiple instances for all messages received for processing as long as each message received retains a unique identifier not the same as any other message. In some cases there may be no further processing after act 607 (assuming message handling or tagging is part of act 606) because it may be that no evidence is found that relates to the message while it is still represented in the cluster cache.

A second process, which may be a complimentary process to the first process described in acts 600 through 607, begins at act 608 when any new evidence that might bear on any cached messages already in the system becomes available or becomes known to the system. At act 609, one or more values may be associated with the new evidence found. New evidence may be a single feature, a group of related features, or any other list of related features.

At act 610, cluster data is searched for the presence of any feature data that matches feature data of the new evidence discovered in act 608. In one embodiment of the invention acts 609 and 610 may be reversed in order without departing from the spirit and scope of the present invention. If this is the case then, if there is no hit in cluster data relating to the newly found evidence, it might be that no value-oriented data is associated with the new evidence.

Assuming the order of acts illustrated; at act 610 it may be determined if there is a data match between evidence and cluster data at act 611. If there is no match, then at act 612 internal or existing data may be updated with the new evidence and any values associated with the new evidence for future reference. In this way any new messages arriving after the update may be initially filtered such that the new evidence is included in the process.

If there is a data match at act 611, then at act 613 the data match may be tracked to the appropriate cluster and message. It may be that any data match may be tracked to more than one cluster and more than one message. For discussion purposes assume that the match is tracked to the cluster and message of the process including acts 600 through 607. With the cluster and message identified in act 613, in act 614 the message data may be retrieved for recalculation including the new evidence of the weighting or scoring used in the initial classification of act 606.

At act 615 if there is no change in classification result after recalculating the weighting or scoring, then the original classification may be validated by default and the process may resolve again to act 612, including updating internal feature data with the new evidence and any associated value data. In act 615, if there is a result change, then at act 616 the message may be reclassified accordingly. Reclassification may include any appropriate message handling like overwriting of the old classification with the new classification to the message in the message store. After reclassification, the process again resolves to act 612 for internal or existing data updating with the new evidence and any associated value data.

It will be apparent to one with skill in the art that there may be more or fewer acts and sub-acts represented in the described processes without departing from the spirit and scope of the present invention. Likewise such included acts may take various orders in the process depending on the exemplary embodiment represented. For example, if all message data is copied to cluster cache after identification and withheld from the message store until at least initial classification then it is possible that a maximum time window for each cluster based for example, on average client log on, may be allowed to approach expiration before messages are forwarded to a message store where they may be accessed. In this case some of the messages forwarded may have been validated and or reclassified by a method of the invention before a client is granted access to them.

The methods and apparatus of the invention can be applied to email systems whether or not they are enhanced for spam-filtering capabilities. The invention may be provided as a stand-alone spam-filtering system or may be integrated with existing email servers and filtering systems without departing from the spirit and scope of the invention.

It will be appreciated by those skilled in the art that the invention is not limited to the exemplary embodiments described, and may be implemented with some or a combination of the described features or other features, with or without modification, without departing from the spirit and scope of the invention.

What is claimed is:

1. A method, implemented on server having one or more processors and memory storing programs to be executed by the one or more processors, for email classification in a spam-filtering system, comprising:
   storing email message data and associated original classification data in a data cache, wherein the original classification is one of a spam classification and a trusted classification with respect to a first email message;
   receiving external evidence after the original classification of the stored email message data, wherein receiving external evidence includes receiving one or a combination of new keywords and new return-path features extracted from email message bodies; and
   responsive to receiving the external evidence, launching a re-evaluation of the first email message stored in the data cache based on the external evidence, wherein the re-evaluation includes one of validating and changing the associated original classification of the first email message, and wherein the first email message is re-evaluated based on the external evidence and one or more variables used to determine the original classification of the first email message.

2. The method of claim 1 wherein receiving external evidence includes acquiring evidence through a search function.

3. The method of claim 1 wherein the data cache includes a portion thereof for caching email feature data and a portion thereof for tracking email messages subject to reevaluation.

4. The method of claim 1 wherein launching a reevaluation of the email message includes activating a search function, wherein activating the search function includes using the new evidence as search input to the search function.

5. The method of claim 1 wherein the reevaluation includes reweighing classification variables with new evidence included as one or more added variables in calculation.

6. The method of claim 1 further comprising defining a time window for which email messages subject to reevaluation are stored in the data cache.

7. The method of claim 6, wherein the time window is based on an average time-based pattern of email access of a client associated with the email messages.

8. A method, implemented on server having one or more processors and memory storing programs to be executed by the one or more processors, for accessing message data for spam classification reevaluation based on new evidence including:
   receiving new evidence related to email data used for spam classification of email messages having an original classification or classifications; wherein receiving new evidence includes receiving one or a combination of new keywords and new return-path features extracted from email message bodies; wherein the new evidence is received after the original classification or classifications of the email messages and the original classification or classifications is one of a spam classification and a trusted classification;
   searching a data source of email data using the new evidence as search criteria;
   obtaining a data match of new evidence to email data stored in the data source;
   accessing a list of one or more message identifiers and one or more associated recipient identifiers from the data source, the list associated with the data match;
   locating, in accordance with the list, one or more allocated memory portions identified by recipient and message identifier; wherein at least a subset of the located memory portions correspond to first email messages having original classifications selected from the set consisting of the spam classification and the trusted classification; and
   retrieving data from those memory portions for use in reevaluating the original classification or classifications of the first email messages, wherein the original classification or classifications of the first email messages are re-evaluated based on the new evidence and one or more variables used to determine the original classification or classifications of the first email messages.

9. The method of claim 8 wherein the system includes a spam filter having a means for receiving external evidence; a data cache for caching the message data and the original classification data; and a mechanism responsive to a triggering system event for launching a reevaluation of message data being tracked, and wherein the data source is the data cache.

10. The method of claim 9 wherein the data cache contains a portion for storing email feature data, and one for storing email feature data, spam classification variables used in initial spam classification, and classification result data.

11. The method of claim 8 wherein the data is represented in the data source as single and unique data entries.

12. The method of claim 8 wherein the match includes one or more features of the new evidence to one or more stored features.

13. The method of claim 8 wherein locating the one or more allocated memory portions is enabled by location information provided in the accessed list.

14. The method of claim 8 wherein the memory portions are allocated per client and contain message data received by the client and organized as a cluster of messages owned by the client.

15. The method of claim 8 wherein the data retrieved includes the original classification indication and the old variables used in the original classification.

16. The method of claim 8 wherein reevaluation of data produces either a validation of the original classification of a message or a change of classification of a message.

17. A non-transitory computer readable storage medium storing one or more programs, which when executed by one or more processors of a computer system, causes the computer system to perform a method comprising:
   receiving new evidence related to email data used for spam classification of email messages having an original classification or classifications; wherein the receiving new evidence includes receiving one or a combination of new keywords and new return-path features extracted from email message bodies; wherein the new evidence is received after the original classification or classifications of the email messages and the original classification or classifications is one of a spam classification and a trusted classification;

searching a data source of email data using the new evidence as search criteria;

obtaining a data match of new evidence to email data stored in the data source;

accessing a list of one or more message identifiers and one or more associated recipient identifiers from the data source, the list associated with the data match;

locating, in accordance with the list, one or more allocated memory portions identified by recipient and message identifier; wherein at least a subset of the located memory portions correspond to first email messages having original classifications selected from the set consisting of the spam classification and the trusted classification; and retrieving data from those memory portions for use in reevaluating the original classification or classifications of the first email messages, wherein the original classification or classifications of the first email messages are re-evaluated based on the new evidence and one or more variables used to determine the original classification or classifications of the first email messages.

18. A system comprising:

a server computer, the server computer including:

a message store to store incoming email messages;

a storage means having instructions for a spam filter to filter the incoming email messages and to classify the incoming email messages, based at least on internal evidence, wherein an original classification for a first subset of email messages is one of a spam classification and a trusted classification; and a cluster cache to store filter result data resulting from the filtering;

wherein upon receiving new evidence related to an email message stored in the message store, wherein the new evidence includes one or a combination of new keywords and new return-path features extracted from email message bodies, the new evidence being received after classifying the incoming email messages stored in the message store, the spam filter re-evaluates a respective email message from the first subset of email messages, wherein the re-evaluation includes one of validating and changing the original classification associated with the respective email message from the first subset of email messages, and updates the cluster cache storing the filter result data, and wherein the respective email message is re-evaluated based on the new evidence and one or more variables used to determine the original classification associated with the respective email message.

19. A method, implemented on server having one or more processors and memory storing programs to be executed by the one or more processors, for classifying email in a spam-filtering system, comprising:

accessing email message data, the email message data having an associated original classification that is one of a spam classification and a trusted classification with respect to a first email message;

accessing new evidence for use in classification, wherein the new evidence includes one or a combination of new keywords and new return-path features extracted from email message bodies and wherein the new evidence is received after the original classification of the email message data; and re-evaluating the original classification of the first email message using the new evidence, wherein the re-evaluation includes one of: validating the original classification and changing the original classification of the first email message, and wherein the original classification of the first email message is re-evaluated based on the new evidence and one or more variables used to determine the original classification of the first email message.

20. The method of claim 19 wherein accessing email message data is a data search function, the search function triggered by arrival of new evidence.

21. The method of claim 19 further including utilizing a data access interface to a data cache.

22. The method of claim 19, further comprising:

rendering email feature data included in the email message data into a searchable portion of memory, wherein the email feature data is used for associating the original classification;

rendering a second portion of the data into an accessible portion of memory; and associating the data rendered in the searchable portion of the memory to data rendered in the accessible portion of the memory.

23. The method of claim 22, further comprising: organizing the accessible portion as a plurality of email message clusters, wherein each cluster identified with a recipient and contains message data sent to that recipient.

24. The method of claim 22, wherein the second portion of the data includes client identification data, message identification data, initial classification indication, classification weighting variables, and unmatched feature data.

25. A non-transitory computer readable storage medium storing one or more programs, which when executed by one or more processors of a computer system, causes the computer system to perform a method including:

storing email message data and associated original classification data in a data cache, wherein the original classification data is one of a spam classification and a trusted classification with respect to a first email message;

receiving external evidence after the original classification of the stored email message data, wherein the receiving external evidence includes receiving one or a combination of new keywords and new return-path features extracted from email message bodies; and responsive to receiving external evidence, launching a reevaluation of the first email message stored in the data cache based on the external evidence, wherein the reevaluation includes one of validating and changing the associated original classification of the first email message, and wherein the first email message is re-evaluated based on the external evidence and one or more variables used to determine the associated original classification of the first email message.

* * * * *

UNITED STATES PATENT AND TRADEMARK OFFICE
CERTIFICATE OF CORRECTION

PATENT NO. : 8,819,142 B1  
APPLICATION NO. : 10/882845  
DATED : August 26, 2014  
INVENTOR(S) : Golub Page 1 of 1

It is certified that error appears in the above-identified patent and that said Letters Patent is hereby corrected as shown below:

In the Claims

Claim 1, col. 17, line 18, please delete "on server" and insert --on a server--; and Claim 8, col. 17, line 58, please delete "on server" and insert --on a server--; and Claim 19, col. 19, line 53, please delete "on server" and insert --on a server--.

Signed and Sealed this
Eighteenth Day of November, 2014

Michelle K. Lee
*Deputy Director of the United States Patent and Trademark Office*